(12) United States Patent
Burke

(10) Patent No.: US 6,562,526 B1
(45) Date of Patent: *May 13, 2003

(54) POLARIZING RESONANT SPHERICAL SCATTERING APPARENT THREE DIMENSIONAL PHOTOGRAPHIC FILM

(76) Inventor: Douglas Burke, 2507 Port Whitby, Newport Beach, CA (US) 92660

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/527,070

(22) Filed: Mar. 16, 2000

Related U.S. Application Data

(63) Continuation of application No. 09/322,701, filed on May 28, 1999, now Pat. No. 6,106,983, which is a continuation-in-part of application No. 08/856,451, filed on May 14, 1997, now Pat. No. 6,064,521.

(51) Int. Cl.[7] .................................................. G03C 9/08
(52) U.S. Cl. .......................... 430/17; 430/346; 430/950; 430/952
(58) Field of Search .......................... 430/17, 346, 950, 430/952

(56) References Cited

U.S. PATENT DOCUMENTS 5,675,437 A * 10/1997 Hart et al. .................. 359/566

* cited by examiner

Primary Examiner—Hoa Van Le

(57) ABSTRACT

Spherical beads of critical dimensions and optical properties are combined with polarizing and photosensitive materials to produce a photographic film which unexpectedly collects apparent three dimensional information in the light carrying images into said film.

10 Claims, 4 Drawing Sheets

POLARIZING RESONANT SPHERICAL SCATTERING APPARENT THREE DIMENSIONAL PHOTOGRAPHIC FILM

FIELD OF THE INVENTION

This invention relates to capturing three dimensional information in an optical image with a new photographic embodiment or film. This application is a continuation of application Ser. No. 09/322,701 file May 28, 1999, now U.S. Pat. No. 6,106,983, which is a continuation in part of application Ser. No. 08/856,451, filed May 14, 1997, now U.S. Pat. No. 6,064,521. The proposed invention is a different species than the above invention.

BACKGROUND OF THE INVENTION AND DISCUSSION OF PRIOR ART

Light can be represented as electromagnetic fields which vary sinusoidally and orthogonal to the direction of propagation as shown in FIG. 1. [where the direction of propagation is along the Z-axis.] In FIG. 1 the electric field component of the wave is denoted by E, and the magnetic field component is denoted by B.

For the purposes of this invention it is only the electric field component of the wave which will interact with matter and produce relevant phenomena. An electric field is simply the force per unit electric charge in a region of space. Equivalently, if an electric charge were in a region of space occupied by an electric field it would experience a force equal to the electric field times the magnitude of the charge.

Electric fields can be represented mathematically as vector quantities indicating their magnitude and direction at a specific point or in a given region of space. FIG. 1A is the electromagnetic wave in FIG. 1, but with the view looking down the axis of propagation, the Z-axis. FIG. 1-A shows some possible orientations of the electric field. These are only some possibilities. Any orientation in the plane normal to the direction of propagation is possible. That plane is represented as the plane that the circle in FIG. 1A occupies.

As light, an electromagnetic wave, propagates, the behavior of the electric field in space and time is determined by Maxwell's equations, which are a set of equations defined by James Clerk Maxwell which constitute the physical laws of electromagnetism. Maxwell's equations have solutions for traveling waves where the electric field varies along an axis as in FIG. 1, varies in a circular of elliptical manner, or varies randomly.

The orientation of the electric field vector and how it changes with time is known as the state of polarization of the electromagnetic wave or just simply the polarization of the light. If the electric field is confined to a single axis as in FIG. 1 it is said to be linearly polarized. In FIG. 1 it is linearly polarized in the X or vertical direction. Since the electric field at any given moment is confined to a plane parallel to the direction of propagation and a plane is two dimensional, there are only two possible independent polarization states for light. We can think of them as horizontal and vertical. Although in physics and mathematics the two unique polarization states used are sometimes right and left circular polarization, these states are simply combinations of vertical and horizontal states that vary in time in the right way to represent an electric field that rotates in a circular clockwise manner or counterclockwise as the wave propagates.

If the electric field in FIG. 1 is not confined to a single axis in the plane but has an equal probability of being in the horizontal or vertical direction and there is no specific time relationship between the vertical and horizontal electric fields the light is said to be unpolarized or randomly polarized.

The electric field can be polarized and confined to an axis that makes an angle, $\theta$, with the horizontal or x-axis as shown in FIG. 1B. Since the electric field is a vector quantity when it is polarized in this manner, it can be broken up into horizontal and vertical components. In figure 1B the horizontal axis is the x-axis and the vertical axis is the y-axis. The electric field E in figure 1B has a horizontal component equal to $E \cos \theta$ and a vertical component equal to $E \sin \theta$, this being a trigonometric fact. It can be said that the electric field in FIG. 1B has a part of itself, $E \cos \theta$, polarized along the x-axis and the rest of itself $E$ is $\sin \theta$, polarized along the y-axis. The sides of the triangle in FIG. 1B formed by E, E $\cos \theta$, and E $\sin \theta$ obey the Pythagorean theorem, which means they obey the relations $E^2 \cos^2\theta + E^2 \sin^2\theta = E^2$. For the purposes of our discussion it must be understood that the electric field E has a component $E \cos \theta$ polarized in the x-direction and a component $E \sin \theta$ polarized in the y-direction.

Some materials act as polarizers. If randomly polarized light enters into a slab of finite thickness of polarizing material with the material's polarization oriented say in the vertical direction, the horizontally polarized portion of the incident light is absorbed and the vertically polarized portion is allowed to pass through the material. The result is that the light emanating out of the polarizing material is polarized in the vertical direction thus polarizing materials polarize light.

One can think of polarizers as having a transmission axis or sense and an absorption axis or sense. It is more general to use the word sense than axis since axis implies the idea of linearity to the imagination of the reader and that does not apply to circular polarizers and so can become confusing when one is trying to provide broad and general clarity.

If linearly polarized light oriented in the vertical direction enters a linear polarizer whose absorption sense is oriented in the vertical direction the light will be absorbed. Equivalently, if linearly polarized light enters a polarizer whose absorption sense is equal to the polarization sense of the light, the light is absorbed. If linearly polarized light enters a polarizer whose absorption sense is orthogonal to the polarization sense of the light the light is transmitted.

The same statements of what happens physically can be made using reference to the transmission sense of the polarizer. For instance, if linearly polarized light enters a polarizer whose transmission sense is equal to the polarization sense of the light, the light is transmitted. If linearly polarized light enters a polarizer whose transmission sense is orthogonal to the polarization sense of the light, the light is absorbed.

Circular polarizers have an absorption sense and a transmission sense as well. The above reasoning carries through for circular polarizers and circularly polarized light. For instance if circularly polarized light enters a circular polarizer with an absorption sense equal to the polarization sense of the light, the light is absorbed. If the absorption sense of a circular polarizer is left, left circularly polarized light is absorbed when it enters the polarizer, etc.

To expand our vocabulary to encompass an understanding of the relationship between linear polarization (of light or materials), circular polarization (of light or materials), and light that is unpolarized the following facts must be rigorously observed.

(1) Unpolarized light can be represented as an equal mixture of horizontal linearly polarized light and vertical linearly polarized light, where the time relationship between the vertical and horizontal linearly polarized states is random.

(2) Unpolarized light can also be represented as an equal mixture of right circularly polarized light and left circularly polarized light, where the time relationship between the right and left circularly polarized states is random.

(3) Linearly (horizontal or vertical) polarized light can be represented as a linear combination of right and left circularly polarized light, where the time relationships between the right and left circularly polarized states is specific.

(4) Circularly (right or left) polarized light can be represented as a linear combination of horizontal and vertical linearly polarized light, where the time relationship between the horizontal and vertical linearly polarized states is specific.

The above facts can be derived from Maxwell's equations or from the quantum mechanical theory of light. Both methods produce the same results. Further the above facts have been verified by experiment with great rigor.

If circularly polarized light enters a linear polarizer the part of the light that has a polarization sense equal to the transmission sense of the polarizer is transmitted and the other part has a polarization sense equal to the absorption sense of the polarizer and is absorbed. The same holds for linearly polarized light that enters a circular polarizer.

Some linear polarizers are composed of metal crystals aligned along a specific direction. These are also called metal polarizers. Metal polarizers do not have an absorption sense but have instead a reflection sense. The orthogonal sense to their reflection sense is their transmission sense. Metal polarizers relate to some aspects of this invention.

The making of sheet polarizers, polarizing material on large sheets of substrates, was pioneered by Edwin H. Land and more by John F. Dreyer. The polarizing layer on these substrates is called a dichroic layer. The phenomena of polarizers and polarizing sheets relate to this invention.

Other materials are largely transmissive, meaning their reflecting qualities are minimal. That is to say when one shines light on them the majority of it goes through them without being reflected or absorbed. Transparent and transmissive materials relate to this invention.

Other materials are partially transparent and diffusive. Diffusive means that they scatter light in many directions. Intrinsically, this diffusive quality is due to natural perturbations in the index of refraction. Extrinsically the diffusive quality is due to pores, grain boundary defects, strain fields, small quantities of particulate matter, and crystallographic defects. Optical materials are generally made to minimize the diffusive quality but in some designs of the proposed invention it is desirable to have a partial diffusiveness. Candidate materials that have a partial diffusiveness include; alkali and alkaline earth halides such as chlorides, bromides, iodes, BaF2, PbF2; oxides such as Al2O3; oxynitrides such as ALON; chalcogenides such as ZnSe and ZnS; and semiconductors such as Si, Ge, and Go, As. The extrinsic diffusiveness can be adjusted depending on how the materials are made. For more details see, Optical Materials, Ed Solomon Musikant; Marcel Dekker, Inc., 270 Madison, N.Y., N.Y. 10016. The partial transparency is a achieved by using only a thin layer of such materials.

Polarizing layers and diffusive layers can be combined as parallel elements onto substrates to produce laminates that can be used for various purposes. Various prior art techniques have been developed to produce such combinations of parallel elements for various purposes. See U.S. Pat. No. 2,776, 598 to Dreyer, U.S. Pat. Nos. 2,788,707 and 2,9997, 390 to Land, U.S. Pat. No. 4,025,688 to Nagy et al., U.S. Pat. No. 5,347,644 to Sedlmayr et al.

When polarizers are spoken of, it shall be understood to mean either a circular or linear polarizer.

If light is traveling through air and enters a material it bends or is scattered. How it is scattered is dependent on the property of the material known as the index of refraction. The index of refraction is commonly denoted by the parameter n, in the literature. If light of wavelength, $\lambda$, is traveling in air and enters a second medium with an index of refraction, n, the wavelength of the light is decreased to $\lambda/n$.

The refractive index is often written as a complex number. The real part has the dielectric constant in it and the imaginary part contains the conductivity.

A weakly conducting dielectric sphere means the material is essentially an insulator.

When refractive index, n, is spoken of it shall mean, $n = \sqrt{\epsilon\mu/\epsilon_0\mu_0}$. Where: $\epsilon$ is the electric permittivity of the material, $\epsilon_0$ is the electric permittivity of free space, $\mu$ is the magnetic permeability of the material, and $\epsilon_0$ is the magnetic permeability of free space. For most materials $\mu \approx \mu_0$ and $n \approx \sqrt{\epsilon/\epsilon_0}$. This is the square root of the dielectric constant. n, is a function of the wavelength (thus frequency) of the electromagnetic wave that is passing through the material. It shall be understood that when, n, is spoken of it is the value of, n, at the wavelengths where the invention operates. Those are approximately the wavelengths of visible light, 300 nm–1000 nm.

When the conductivity of a material is relevant, it shall be spoken of as the "conductivity". It will not be referred to as a component in the imaginary term of the refractive index. The conductivity is also a function of wavelength. The relevant conductivities are at the wavelengths of light, where the invention operates.

When light is traveling through air and encounters an object with a different index of refraction than air it scatters off of the object. If that object is a sphere the light scatters in a particular way. The scattering of light waves off of a sphere as a function of its radius, index of refraction, and conductivity is a problem that was solved by Gustav Mie in 1908; G. Mie Ann. d. Physik (4), 30 (1908), 377. Mie's theory is also treated in "Light Scattering by Small Particles," H. C. van de Hulst, Dover, N.Y., 1981, and in "Principles of Optics," Max Born and Emil Wolf, Pergamon Press, 4th ed. 1970.

When an electromagnetic wave interacts with another electromagnetic wave a larger or smaller wave can be formed. As shown in FIG. 1 the electric field oscillates up and down from a maximum positive vertical direction, to zero, and down to a maximum negative vertical direction.

When two waves interact and their electric fields are both maximum in the same direction at the same time, the fields add and form a bigger wave. They are said to interfere constructively. They are in phase.

When two waves interact and their electric fields are both maximum but pointing in opposite directions, at the same time the fields add to zero. The waves disappear. They are said to interfere destructively. They are out of phase.

When waves interact and partial constructive and destructive interference along the wave fronts occurs a pattern of maxima and minima is formed. This pattern is called a diffraction pattern. The waves are said to diffract. Diffraction occurs if the difference in phase between the waves is non-random. The phenomena of diffraction relates to this invention.

Polarizing materials are often made of dichroic materials. A dichroic crystal has two refractive indices within along two different axes. The two axes are sometimes referred to as the extinction (absorption) axis and the transmission axis. The refractive index along the extinction axis shall be called $n_\perp$. The refractive index along the transmission axis shall be called $n_{11}$.

The proposed invention uses combinations of polarizing diffusive and reflective materials in conjunction with spherical beads of critical diameter and refractive index defining resonant conditions to achieve an unexpected result.

Various prior art techniques and apparatus have been heretofore been proposed to present three dimensional images on a viewing screen using a stenographic technique such as on a polarization conserving motion picture screen.

See U.S. Pat. No. 4,955,718 to Jachimowicz, et al., U.S. Pat. No. 4,963,959 to Drew, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,9396,6058 to Tanaka, et al., U.S. Pat. No. 4,93,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. 4,853,764 to Sutter, U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagata, U.S. Pat. No. 4,523,226 to Lipton, et al., U.S. Pat. No. 4,376,950 to Brown, et al., U.S. Pat. No. 4,323,226 to Lipton, et al., U.S. Pat. No. 4,376,950 to Brown, et al., U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat. No. 4,151,549 to Pautzc, U.S. Pat. No. 3,697,675 to Beard, et al.

These techniques and apparatus involve the display of polarized or color sequential two dimensional images which contain corresponding right eye and left eye perspective views of three dimensional objects. These separate images can also be displayed simultaneously in different polarizations or colors. Suitable eyewear, such as glasses having different polarizing or color separations coatings permit the separate images to be seen by one or the other eye.

U.S. Pat. No. 4,954,890 to Park discloses a representative projector system employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art of this type. This time sequence technique also requires the use of eyewear.

There is another example of the timed sequence technique in which the left and right eye views have different polarization's and are viewed not with glasses but with a single polarized screen over both eyes. The screen is formed of a transparent material that has two or more different polarization coatings. U.S. Pat. No. 5,347,644 to Sedlmayr discloses representative prior art of this type.

Alternating polarization and timed sequence techniques involve photographing the image using two cameras or a dual view camera. The proposed invention involves using a single view conventional camera, but employs a special photographic film. That special film is the proposed invention.

U.S. Pat. No. 5,543,964 to Taylor et al. is another example of superimposing images to create an illusion of depth based on the stereo nature of human vision. Another superimposition technique is shown in U.S. Pat. No. 5,556,184 to Nader-Esfahani.

U.S. Pat. No. 5,559,632 to Lawrence et al. introduces special glasses for viewing regular images in apparent three dimensions employing stereoscopic theory. The proposed invention is not based on stereoscopic theory or superimposition of two dimensional images.

It is known that holographic techniques have been used for three dimensional information recording and display. These techniques involve illuminating a three dimensional object with a coherent monochromatic (laser) beam of light and interfering that light with a reference beam from the same source. The interference pattern is collected on a recording film medium and illumined with the same coherent light from which it was made. The result is a projected image of the object in three dimensions able to viewed without eye wear. Holographic techniques are not in general use because inherent in them are many limitations: an object has its dimension limited to an extent that it can be illuminated by a laser beam; the object should be stationary; a photograph thereof must be taken in a dark room.

Since a laser source has to be used the images obtained are of a single color. This is not useful in most commercial applications. The proposed invention collects an image of a three dimensional scene in apparent three dimensions with incoherent white light. There is no need to illuminate the scene or assembly of objects with coherent monochromatic light. The scene can be moving and recorded as a motion picture. All of the colors in the scene can be recorded.

Some of the limitations of holography have been addressed by a technique known as composite holography.

Composite holography consists of photographing a three dimensional object in a plurality of different directions under usual illumination such as natural light to prepare a plurality of photographic film sections on which two-dimensional pictorial information is recorded. These two dimensional photographs are information images and are separately illumined with coherent (laser) light and are recorded as holograms. These holograms are then simultaneously illumined with coherent (laser) light producing a projection of the perspective information of the three-dimensional object to be recognized by unaided human eyes at different angles depending upon their position with as much effect as one substantially views the image of the three dimensional object.

Composite holography was limited since the size of the recording medium of the holograms had to be large leading to a large sized overall device making it economically impractical. That limitation was resolved by Takeda et al. as disclosed in U.S. Pat. No. 4,037,919. Also in that disclosure is a detailed description of composite holography.

The disadvantage of composite holography is that it involves photographing the object from many different angles and making a hologram of each of those photographic images. This makes it time consuming, laborious and expensive.

The proposed invention overcomes all of the limitations in size, color, and cost of holography and composite holography.

Polarizers, polarizing crystals and photosensitive materials have been combined to produce photographic film by Edwin Land, U.S. Pat. No. 2,997,390. The spherical beads of critical diameter in the proposed invention are absent in Land's film. Land's film thus does not collect the three dimensional information in the image, that is collected by the proposed invention.

Polarizing layers and diffusive layers containing diffusive particles have been combined to produce polarizing embodiments for various purposes. Examples of these are found in U.S. Pat. No. 4,268,127, to Oshima, U.S. Pat. No. 5,347,644 to Sedlmayr.

These embodiments lack the spherical beads of critical diameter required to achieve the unexpected result of the proposed invention. They also lack the critical constraints on the refractive index of the proposed invention.

The spherical beads are of dimensions on the order of wavelengths of light. They can be made of glass to high precision. They can also be made of polyethylene. These spheres are grown in chemical reactions by polymer chemists. Duke scientific is a manufacturer of such beads.

OBJECTS AND ADVANTAGES

There are many types of photographic film that record optical images. In the recording process most of the three dimensional information is lost.

Holography requires a coherent light sources and has limits on the size of the object to be recorded, the number of colors that can be recorded and the cost.

Accordingly several objects and advantages of the proposed invention are:
(a) To produce a photographic film that can record images in apparent three dimensions wherein the film can be used in a standard camera with a single view.
(b) To collect three dimensional information in a photograph where all you do is change the film that you use in the camera.
(c) To collect images in apparent three dimensions with more three dimensional qualities than the present photographic techniques with no substantial increase in cost.
(d) To collect images in apparent three dimensions on a photographic film wherein the physical objects whose images are being collected are illuminated with incoherent white light.
(e) To collect three dimensional optical information on a photographic film of an object wherein the object being photographed without the limitation in size that inhibit holography.
(f) To collect three dimensional optical information of a scene without having to illuminate the scene with a coherent (laser) light source.
(g) To collect three dimensional optical information on a photographic film wherein the image recorded can be viewed in apparent three dimensions without the use of eyewear.
(h) To collect three dimensional optical information of a scene on a photographic film wherein objects in the scene may be in motion.
(i) To collect three dimensional optical information on film, wherein after the film is developed incoherent white light is projected through the film, thus projecting the images onto a viewing screen wherein said images can be viewed in apparent three dimensions without the use of eyewear.
(j) To collect three dimensional images on a film which can then be projected.
(k) To collect three dimensional images on a film that can be a print.

DESCRIPTION OF THE INVENTION

All of the designs of the proposed invention are photographic films or embodiments Transparent substrates are not described since it is obvious to one skilled, how and when they are needed. Further different additional substrates will be employed depending on whether the film is projection stock or print stock.

The photosensitive layers may be single layers or a multiplicity of layers comprising a photosensitive recording system or technology.

It is important that the photosensitive material be as close as possible to the beads. The importance of this will be mentioned in the section of theory.

Figure 1:
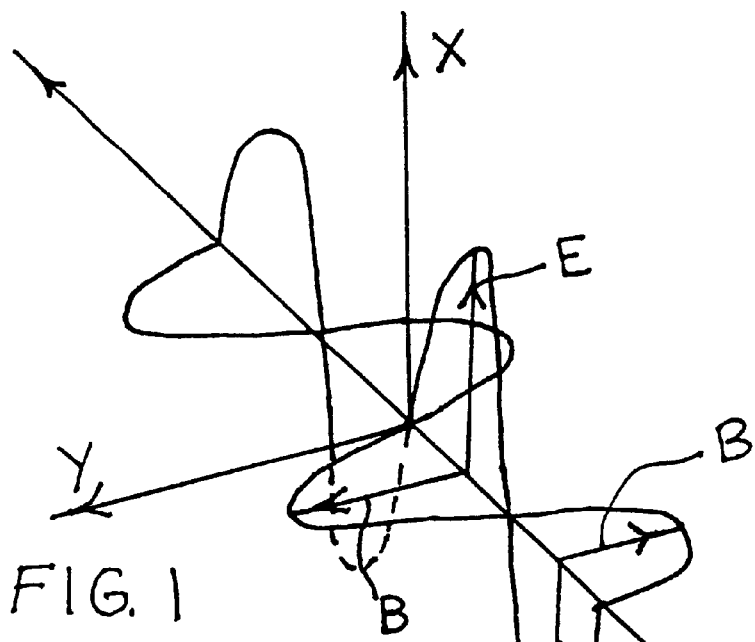
FIG. 1 Travelling electromagnetic wave.
Figure 1A:
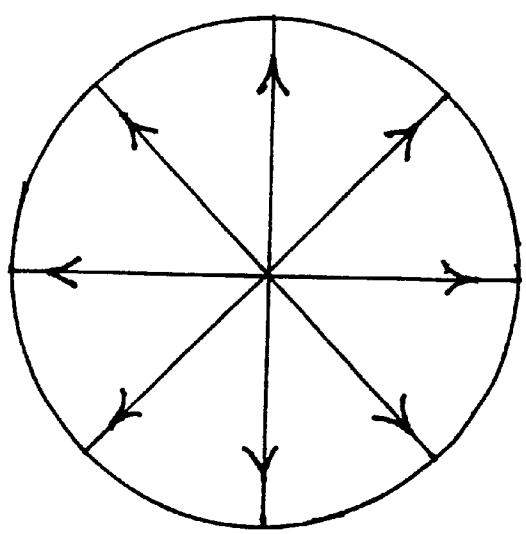
FIG. 1A Some possible orientations of the electric field in an electromagnetic wave.
Figure 1B:
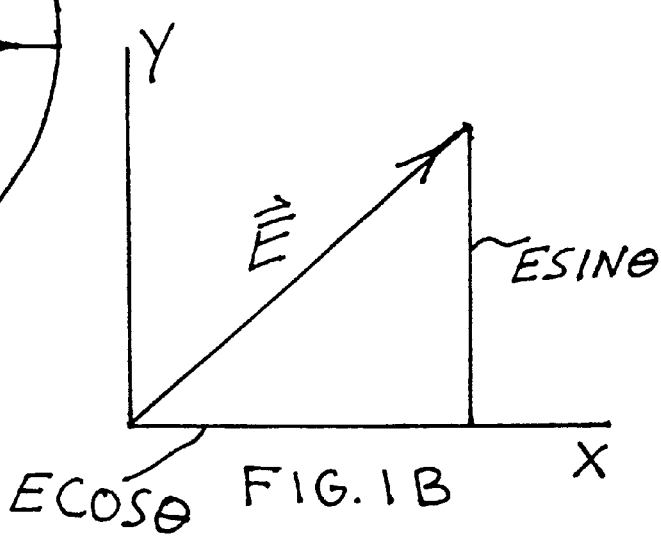
FIG. 1B Trigonometric projections of an electric field vector.
Figure 2:
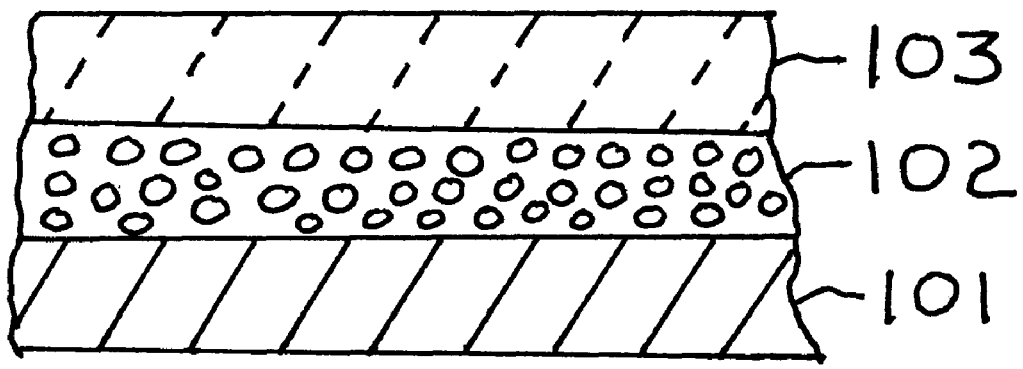
FIG. 2 Perspective view of a cross section of photographic film.

A first film of the proposed invention consists of parallel plane layers. A perspective view of its cross section is shown in FIG. 2. It consists of a polarizing layer, 101, a partially transparent bead layer, 102, and a photosensitive layer, 103.

Figure 3:
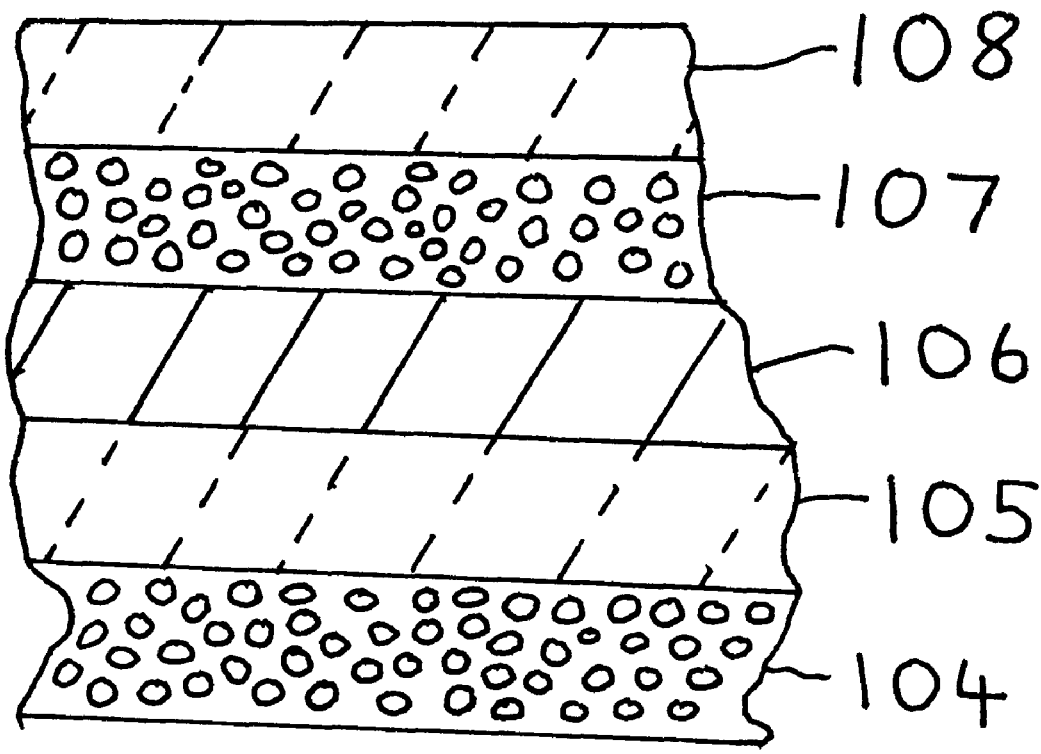
FIG. 3 Perspective view of a cross section of photographic film.

A second film of the proposed invention consists of parallel plane layers. A perspective view of its cross section is shown in FIG. 3. It consists of a partially transparent bead layer, 104, a photosensitive layer, 105, a polarizing layer, 106, a second partially transparent bead layer, 107, and a second photosensitive layer, 108.

The partially transparent bead layer consists of partially transparent beads, as spherical as possible, embedded in a base whose index of refraction is different than that of said beads.

Figure 4:
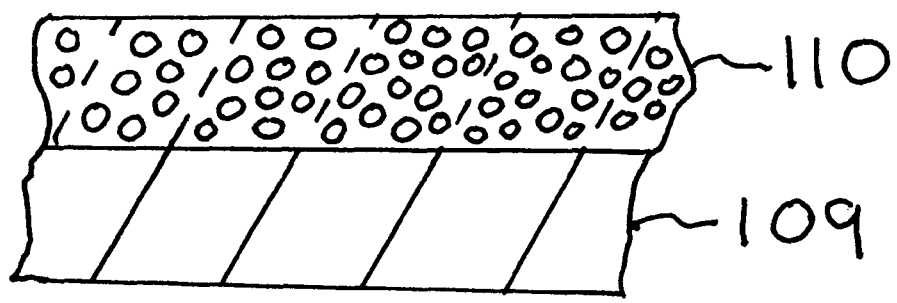
FIG. 4 Perspective view of a cross section of photographic film.

A third film of the proposed invention consists of parallel plane layers. A perspective view of its cross section is shown in FIG. 4. It consists of a polarizing layer, 109, and a partially transparent photosensitive bead layer, 110. This photosensitive bead layer consists of partially transparent beads embedded in a photosensitive base whose index of refraction is different than that of said beads.

Figure 5:
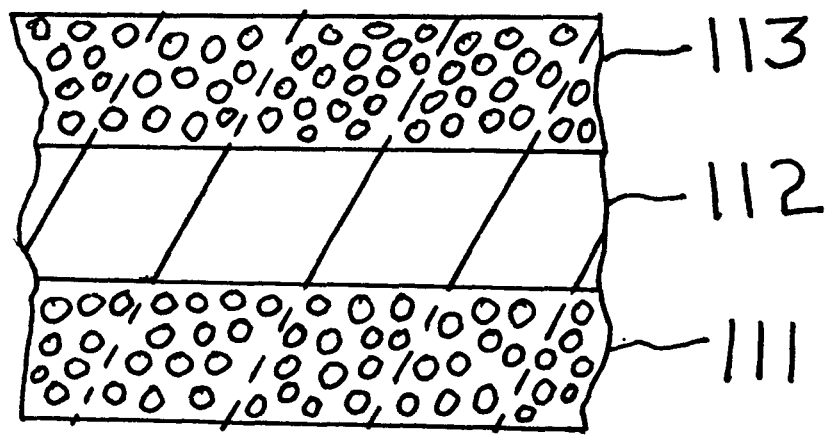
FIG. 5 Perspective view of a cross section of photographic film.

A fourth film of the proposed invention consists of parallel plane layers. A perspective view of its cross section is shown in FIG. 5. It consists of a partially transparent photosensitive bead layer, 111, a polarizing layer, 112, and a second partially transparent photosensitive bead layer, 113.

A fifth, sixth, seventh, and eighth film of the proposed invention consist of parallel plane layers. They are constructed by taking the first, second, third, and fourth films and replacing the polarizing layer with metal polarizing layer.

Figure 6:
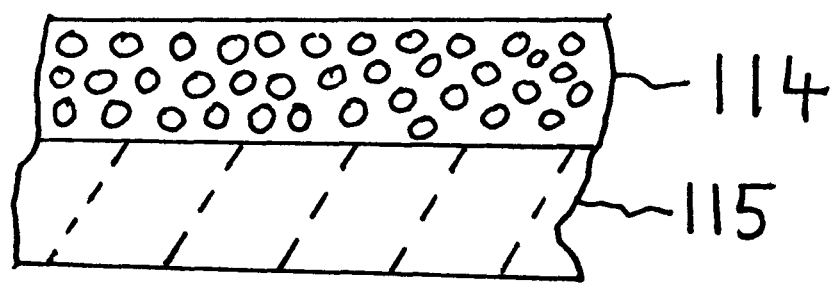
FIG. 6 Perspective view of a cross section of photographic film.
Figure 7:
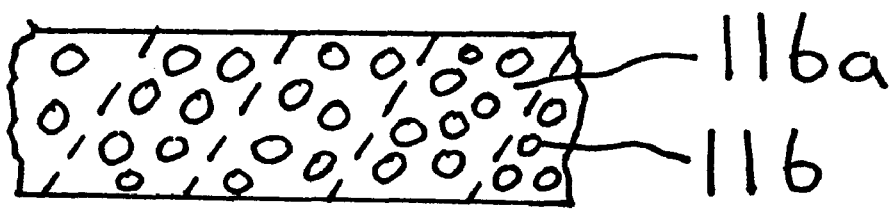
FIG. 7 Perspective view of a cross section of photographic film.

A ninth film of the proposed invention consists of parallel plane layers. A perspective view of its cross section is shown in FIG. 6. It consists of a partially transparent bead layer, 114, and a photosensitive layer, 115, A tenth film of the proposed invention consists of a parallel plane layer. A perspective view of its cross section is shown in FIG. 7. It consists of a partially transparent photo-sensitive bead layer.

The ninth and tenth films lack a polarizer and are inferior to the earlier designs. They ca be used with a polarizing filter on the camera lens, with still inferior results. Used alone they have negligible function. However if the beads or the base are composed of a dichroic material they will work.

It is critical that the beads have a size on the order of the wavelength of the light in that is carrying the image. This is a resonant condition. The beads will then resonantly scatter the light into spherical waves. For visible light in air the dimension would be between 300 nm–1000 nm. It is those spherical waves which contain the depth information that must be recorded as soon as possible. The wavelengths will be shifted by the refractive index of the base. The significance of these conditions along with other key information will be discussed in the sections on operation and theory.

Beads much smaller than the wavelengths of light inhibit the functioning of the invention. The wavelength of the light in the medium surrounding the beads should be about equal to the size of the beads. The surrounding medium is the base in which the beads are embedded. The wavelength of light in the surrounding medium, $\lambda_{sm}$ is the wavelength in air, $\lambda_0$ divided by the refractive index of the surrounding medium, $\lambda_{sm}$.

Thus $\lambda_{sm}=\lambda_0/n_{sm}$. It is best if $n_{sm} \sim 1$. That way $\lambda_{sm} \sim \lambda_0$. The diameter of the beads, d, being $d \sim \lambda_0$, gives rise to a critical resonant conditions. $n_{sm}$ should be close to one because the bead layer as a whole needs to be partially transparent. With beads resonantly scattering spherical waves the surrounding medium needs to be somewhat transparent if the layer as a whole is going to be partially transparent. If the bead layer becomes opaque there is no transmissive diffusive transfer and there is no photograph.

If one wanted to get the film to function with beads smaller than 300 nm, it is difficult. If one used beads of a diameter d=100 nm, lets work through the necessary parameters to see if the film will work. Assume the light has an average wavelength in air $\lambda_0$=500 nm. The wavelength in the surrounding medium is $\lambda_{sm}$=500 nm/$n_{sm}$. If we need the wavelength of the light in the surrounding medium to equal the diameter of the bead we set 100 nm=500 nm/$n_{sm}$. This yields $n_{sm}$=5.

If the index of refraction of the medium surrounding medium is 5, most of the light will experience total internal reflection and the bead layer will be opaque. If the bead layer is opaque, there is no photograph. The film will not function.

If the beads are metallic they can be smaller than the wavelength and resonantly scatter light, of wavelengths larger than their diameter. Gold spheres in particular will scatter 550 nm light resonantly even when they are much smaller than this. The problem with using metallic spheres is that if you employ a lot of them to make the optical surface area large the bead layer becomes opaque and a complete reflector.

If the density of spheres is low there aren't enough of them, for the film to function. You can still use smaller metallic spheres by controlling other parameters but the result is not optimum.

It is possible to use smaller metallic spheres of low density that are arranged in an ordered array. This increases the optical cross section and compensates for the lower optical surface area of the total number of spheres. The spheres are not numerous because the entire layer needs to be partially transparent. These conditions will function but since the spheres are smaller than the wavelengths some of the three dimensional information is lost. It is also difficult to ensure the sphericity of particles that small. Lack of spherical symmetry will also result in loss of three dimensional information. The diffraction patterns created will get blurry and less distinct even when you have perfect spheres the scattering is not always spherically symmetric. The result is loss of depth.

With special restrictions some limited effects can be seen with conducting spheres smaller than the wavelengths. The conditions are not optimum. Even these conditions giving limited results have the sphere not much smaller than the wavelength of light.

Weakly conducting spheres slightly larger than the wavelength of light can be used if the spheres have constraints placed on their material properties.

The index of refraction of the sphere can be adjusted to give a limited working condition. The index of refraction of the surrounding medium must be close to one. Let the diameter of the sphere be, d. Let the refractive index of the dielectric sphere be, n. Let the wavelength of the light in the surrounding medium be $\lambda$. If $(2\pi d/\lambda)(n-1) \approx 4$, Mie's theory of classical scattering gives a resonance in the total scattering. If d is $2\lambda$, n is about 1.3. If d is $3\lambda$, n is 1.2.

These conditions will allow the film to function, but not optimally. Since the sphere is bigger than the wavelengths some of the depth information is lost. The reason for this is discussed in theory. The bigger the sphere is with respect to $\lambda$, the more information is lost.

It is not desirable to adjust the index of refraction of the surrounding dielectric medium to increase the wavelength of light in the medium to equal the diameter of the larger spheres. This would require a material with an index of refraction less than one. This occurs in dispersive media where resonant absorption is taking place. Absorption is undesirable because it is a loss of information, loss of signal which leads to no effect and no photograph.

So as, d, gets much bigger than $\lambda$ the effect is diminished. Small weakly conducting dielectric spheres with $d<\lambda$ can be used with limited effects by placing the same constraints on the refractive index of the sphere. Again the refractive index of the surrounding medium must be close to one. The refraction index of the sphere must satisfy $(2\pi d/\lambda)(n-1) \approx 4$.

For $d=2\lambda/3$, n=2. This restriction on, n, will yield some limited results for spheres slightly smaller than, d. There is however a huge cost. A refractive index, of, 2 of the spheres will limit the number of spheres and therefore the optical surface area. This high refractive index of the spheres makes the bead layer become opaque as the number of spheres increases. This makes it difficult for the film to function. For $d=\lambda/3$, n=3 the danger of the bead layer, becoming opaque is even worse. Clearly these conditions are not optimum. The importance of the partial transparency of the bead layer will be expanded on again later.

The resolution of the photosensitive layer must be high enough to record regions of darkness and light which vary over a dimension of the wavelength of light. This is because a diffraction pattern is formed between the incoming waves and the polarized scattered spherical waves. The scattered polarized spherical waves contain the depth information. This is the news that is a discovery of the invention. It will be commented on in more detail in the sections on theory and operation.

The laws of photography will determine the chemistry resolution, exposure, etc., of the photosensitive material The optical surface area of the bead layer is the surface area of the beads times the number of beads. The ratio of the optical surface area to the area defined by the perimeter around the frame of film should be high enough to equal the same ratio in the real scene in time and space.

For example imagine that you are photographing a tree. If the tree is ten meters high and ten meters wide the area of the boundary of the tree, if you draw it in two dimensions, would be one hundred square meters. Now look at every leaf of the front half of the tree. If the surface area of each leaf is 0.01 square meters and there are one million leaves, the total surface are of the leaves is ten thousand square meters. The ratio of total surface area in the depth of the scene (tree) to the area of the two dimensional boundary surrounding the tree is one hundred. The optical surface area of the bead layer to the area defined by the perimeter of the frame of film would ideally be at least one hundred.

For some scenes the ratio of the above mentioned areas may only be five or ten. The important thing to remember when engineering a film is that the beads extract the depth in the image. The more depth in the scene, the more surface area, the more beads you need.

If the beads in the bead layer are arranged in an ordered array the optical scattering cross section is increased. This makes the cross section proportional to the square of N, instead of N. N is equal to the number of scatterers. In this case it would be the number of bead. Placing the beads in a perfectly ordered array will increase the performance of the film. However if the beads are arranged randomly the film will still function impressively.

The bead layer can be composed of a series of sublayers. Each sublayer would have beads of a single diameter. This would collect images of isolated colors in the different bead sublayers. These photosensitive surrounding medium would have to have a refraction index near if not equal to one. The spheres would have to have a refraction index different from the surrounding medium, but also close to one. This would be a specialty film.

The beads can be replaced with diffusive particles. The ideal shape is a sphere. If the diffusive particles are not spheres it is best if they have as much spherical symmetry as possible since the production of spherical waves is needed. The particle size should conform to the critical dimensions of the beads as mentioned.

The bead layer can be replaced with an intrinsically diffusive layer. This is a material that has a periodic spatial variance in its index of refraction. The distance over which the refraction index varies through one cycle should approximately be the size of the wavelength of light. The periodic regions within the layer should be as spherical symmetric as possible.

Resonant spherical scatterers combined with a polarizing layer and photosensitive material creates a structure that records images in apparent three dimensions. Ideally the scatterers are about equal to the wavelength of light in the medium surrounding the sphere.

Since the bead layer needs to be partially transparent the refraction index of the surrounding medium should be close to one.

For scatterers smaller (100 nm–300 nm) or larger (1–3 microns) than the wavelengths of light the invention will function with limited results if the mentioned optical parameters are constrained as described.

The reason why these structures collect apparent three dimensional information is unobvious and is discussed in the sections on operation and theory.

OPERATION OF THE INVENTION

The light carrying the information of the image contains all the information relating to the depth or third dimension in the image.

When the light passes through the polarizer it becomes polarized light. The polarized light then scatters off of the beads (resonant spherical scatterers).

The beads resonantly produce spherical waves. These spherical waves diffract with the incoming wave.

This diffractive pattern is recorded in the photosensitive medium.

Figure 8:
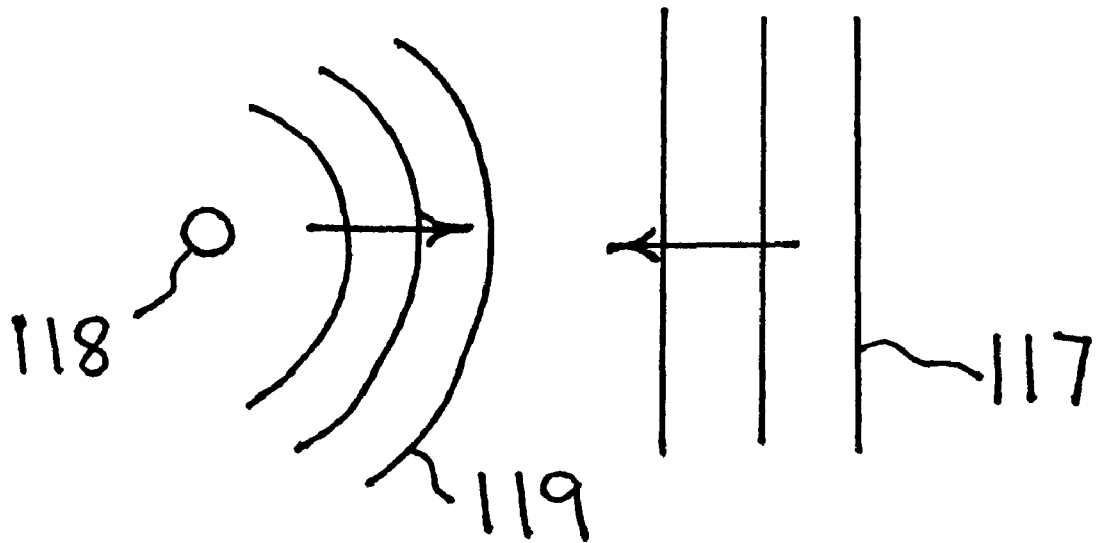
FIG. 8 Incoming wave and spherically scattered wave in the neighborhood of a spherical bead.

Referring to FIG. 8, the spherical waves, 119, produced, are emanating from the bead 118. These scattered spherical waves, 119, diffract with the unscattered incoming wave, 117, which is more planar than spherical. The scattered spherical waves contain the three dimensional information. When they diffract with the incoming wave, the diffraction pattern is recorded in the photosensitive material. The three dimensional information is then stored. The idea that the 3D information is contained in those spherical waves is new. It is expanded upon in the section on theory.

The diffraction pattern formed must be recorded near the bead to avoid influence from other scatterers. This is one reason why the photosensitivie material must be close to the bead. This makes the diffraction pattern more pronounced.

When the incoming wave, 117, is polarized the diffraction pattern occurs.

For unpolarized light there is negligible effect.

The diffraction of the resonantly produced spherical polarized waves is the basic dynamic operation operation of the invention which is supported by the specific static structures described.

The diffraction takes place spherically around each bead not just in the backscattered direction.

The difference in phase between the incoming photons and the scattered waves is defined since they came from the same source. That source is the incoming wave. The presence of multiple wavelengths does not destroy the diffraction pattern since each sphere resonantly scatters light of wavelength equal to its dimension. So each sphere will have a diffraction pattern around it distinctly signatured in wavelength by its dimension. Averaging overall the sphere sizes which range through the wavelengths of light, all the colors are included.

The film designs named first third, fifth, and seventh films in the section on description operate as already described.

I shall refer to the numbered films as different designs.

The designs of the second and fourth films have two bead layers, as shown in FIGS. 3 and 5. The incoming wave that diffracts off the first bead layer is unpolarized. The diffraction in the second bead layer is polarized. This gets as much spherical information as possible out of the polarization sense that gets absorbed by the polarizer before it gets absorbed.

The designs of the sixth and eighth films have a metal polarizer. This allows for polarized diffraction in both bead layers in the following manner. The incoming light is unpolarized. A portion of it scatters off the beads and diffracts as spherical waves with the incoming wave. The light that continues on through the bead layer hits layer. A portion of it is reflected. As it is reflected it becomes fully polarized with a polarization sense equal to the reflection sense of the polarizer. This fully polarized light travels back into the first bead layer, scatters diffracts and is recorded.

The portion of the light that hits the polarizer and did not reflect was transmitted. When it transmitted through the polarizer it became fully polarized light with a polarization, sense equal to the transmission sense of the polarizer. This fully polarized light travels into the bead layer scatters, diffracts, and is recorded.

These designs resonantly scatter and record each of the two polarization states separately. This gives rise to efficient extraction of three dimensional information.

The ninth and tenth film designs are inferior. If they are used with a polarizing lens on the camera they can function in the ways described. These designs are limited.

In all the designs the spheres can also be made photo sensitive.

In the ninth and tenth designs the spheres can also be made of a dichroic material. In this case the incoming wave is spherically scattered and gets polarized simultaneously. The polarized spherical scattered wave diffracts with the unpolarized incoming wave. This is not maximum diffraction because the incoming wave is still unpolarized, but, it will function. Each sphere's polarization axis will have random orientation with respect to all other spheres. Each sphere will emit its own polarized wave, that will have random orientation with respect to every other sphere's scattered wave. That doesn't matter since the interference takes place separately near each sphere with its own pair of incoming and scattered waves.

More details of the recording of depth and how depth is packaged in light is discussed in the section on theory.

THEORY OF THE INVENTION

The proposed invention is based on a new theory of how depth or three dimensional information is packaged or stored in light. In the theory there is something very special about spheres, and spherical symmetry. According to the theory.

When white light (light of multiple wavelengths) illuminates a real physical three dimensional scene it scatters off of every point in the scene. Actually those points are not infinitely small. They are about the size of the wavelengths of light. So each of these points can be called a finite sized point. It shall be understood that the size is a wavelength of light.

From each of these finite points a spherical wave is formed as the light scatters. All of these spherical waves add up to form a summation of waves that carries the image of the real physical three dimensional scene.

As the summation of waves (wavefront) moves away from the real scene the sphericity in the wave front decays. It does not decay to zero but it does decay. It does not deacy to zero, means its still there. The invention proposes that within that sphericity is the depth or three dimensional information. When the light hits the spherical beads its sphericity is amplified or reborn. It is knocked back into spherical states which contain the depth information. This information is packaged in the scattered spherical waves produced by the beads. The beads extract the spherical history of the incoming wave. That history is the three dimensional information in the original real physical three dimensional scene.

The polarization mixture of the incoming light also contains some depth information. Each finite point source of spherical waves also had a polarization that has some signature of depth to it. So it is desirable to collect diffraction patterns of both polarizations.

The incoming light gets polarized and scatters off of the spheres producing spherical waves which contain the 3-D information. These waves diffract with the incoming wave. Since each sphere is of a single resonant dimension it produces resonant spherical waves of approximately a single wavelengths which diffract with the same wavelength in the incoming (non-scattered) wave. This diffraction pattern is recorded. The three dimensional information is contained in that diffraction pattern. The incoming light of wavelength equal to the scattered spherical wave, and that specific spherical scattered wave, have the same random fluctuations in phase since they come from the same source. That source is the incoming wave. The difference in their phase is distinct and gives rise to diffraction. The spherical wave has a characteristic phase shift with respect to the incoming wave.

The diffraction is most pronounced when the incoming light is polarized. Unpolarized waves have negligible or no diffraction.

Maximum information is recorded when diffraction patterns from both polarizations are collected.

The diffraction is most prominent the closer you are to the sphere. As you get farther away the pattern is lost. The real physical three dimensional scene has a physical surface area equal to the sum of the surface area of each object or boundary in the scene. The area of any two dimensional cross section of the scene is less than the actual surface area of the real physical scene. The real three dimensional scene always has a higher surface area than any of its two dimensional cross sections.

Consequently if you are going to collect three dimensional information in the film the optical surface area of the film should be higher than the area defined by the boundary of the two dimensional perimeter of the film. This follows from conservation of geometry. The more surface area in the scene the more depth information in the scene. This is three dimensional geometric information. If you are going to collect it, it has to go somewhere. It is packed into the spherical diffraction patterns surrounding the optical surface area of the beads. The optical surface area of the film is the surface area of each bead times the number of beads.

If the beads have a refractive index close to one the optical surface area can be made large. For a larger refractive index, say closer to two, the optical surface area may only be able to be ten times larger than the two dimensional area defined by the boundary of the film. This ratio can't be too high for larger refractive index spheres because the bead layer starts to become opaque, which has been established, to be a condition of no photograph. The optical surface area should be at least five to ten times the area defined by the boundary of the frame of film.

The actual surface area of the beads is proportional to the number of beads, N. If the beads are arranged in an ordered array the scattering cross section will increase. If the beads are each identical indistinguishable scatterers the total optical cross section will be proportional to to the square of N, instead of N. The beads can be identical if they are all the same diameter. The diameter would be chosen to be the average size of the wavelengths of light or the size of the largest wavelength. Putting this order into the bead layer and increasing the scattering cross section makes up for lost optical surface area. This ordered arrangement of scatterers can increase the magnitude and clarity of the diffraction patterns described.

The bead layer may also have more order in it by composing it from a multiplicity of sub bead layers. Each sublayer can have an ordered monolayer (or polylayer) of beads with identical diameters. As an example there could be eight such sublayers with diameters 300 nm, 400 nm . . . 1000 nm respectively. This would cover the relevant wavelengths and the beads would have maximum order in their arrangement.

This multilayered bead layer records a three dimensional image in each sublayer.

Light of wavelength, $\lambda$, obeys Maxwell's equations and quantum mechanics. Quantum mechanics can treat light as a particle with an uncertainty in its position approximately equal to its wavelength.

In this part of the theory we shall treat the light as particles, photons. When each photon encounters a sphere it has a position uncertainty, via heisenberg, in its three directions in space about equal to, $\lambda$. If the diameter of the sphere is equal to $\lambda$, the photon is approximately likely to scatter off any point on the surface of the sphere. This gives rise to resonant production of spherical waves. This is resonant extraction of spherical information. This is resonant extraction of three dimensional information. This is a resonant condition. This resonant condition yields maximum sphericity in the scattered wave and in that sphericity is contained the depth or three dimensional information. This is a discovery of the invention.

Each scattered spherical wave emanates from the center of each bead. Consider a spherical wave emanating from a given bead. Imagine an imaginary concentric sphere surrounding the bead, larger than the bead. The imaginary sphere is concentric with the bead. That means it shares a common center with the bead. Now imagine that you are on the surface of this imaginary concentric spherical surface surrounding the bead. As the scattered wave passes through this surface, the direction of propagation is normal to the surface of the sphere. That means the electric field is tangent to the surface of the sphere. That means the electric field has curvature. The depth or 3D information is contained in that curvature of the electric field. The information in that curvature gets recorded in the diffraction pattern surrounding the sphere as described. Again, the depth information is contained in the curvature of the electric field in the scattered light which emanates spherically from each bead. This curvature is sphericity, and contained therein is the depth information. This is a discovery of the invention.

For spheres of diameter d, less than the wavelength of light there are two scenarios where the invention can function in a limited capacity. The first scenario for, d, is if the sphere is a weakly conducting dielectric. Mie's classical theory gives a resonance. The index of refraction of the surrounding medium must be close to one. The refractive index of the sphere, n, must obey Mie's relation $(2\pi d/\lambda)(n-1) \approx 4$. This gives a resonance according to classical theory. This resonance combined with the polarizer will collect some depth. However the quantum condition $(d=\lambda)$ for spherical resonance is not maximum so the effective function is limited. The function is further impaired because as, d, gets small with respect to, $\lambda$; n, gets large. The bead layer starts to become opaque. The photograph is not recorded. The amount of light required gets to be too high. This scenario of limited function encompasses d as small as $\lambda/3$.

The second scenario that gives limited function is if the spheres are metallic. Gold is the best material to use in this case. In general though another Mie condition, $d \approx 1.2\lambda/\pi$ will give classical scattering resonance for most metals. Gold is special. The spheres can be as small as 100 nm. Still, the quantum condition $(d=\lambda)$ for spherical resonance is not maximum. Function is limited. Depth is lost.

If the sphere is larger than, $\lambda$, the photon, by its uncertainty in position, is more likely to scatter. off of the front of the sphere than the back of it. This creates an asymmetry in the scattered wave and presents a loss in spherical symmetry. For larger dielectric spheres if the refraction index is tightly controlled as discussed earlier, some effects of depth recording can still be achieved, though limited. These larger spheres are weakly conducting dielectrics and their diameters can extend up above one micron. The surrounding medium must have a refraction index close to one. The classical scattering resonance from Mie theory is when $(2\pi d/\lambda)(n-1) \approx 4$. Again d is the sphere diameter and $\lambda$, is the wavelength of light in the surrounding medium, n, is the index of refraction of the dielectric sphere. If $d=2\lambda$, $n=1.3$, to give a resonance in the scattering amplitude. These conditions will allow a limited function of the film for spheres up to 2 microns in size. Never the less this is not optimum. The larger beads as mentioned do not produce maximum sphericity in the scattered waves. Thus there is loss of three dimensional information. Spheres much bigger than $\lambda$ will not work well. The quantum condition $(d=\lambda)$ is absent.

Now it is important to reiterate the importance of the partial transparency of the bead layer. The bead layer must be partially transparent in order for the image to be transferred to the photosensitive medium; to be viewable after the photograph is developed; and to be able to be projected with light to a viewing screen after the photograph is developed. This scales the refraction index of the medium surrounding the beads. It should be close to one:

When a photon of wavelength, $\lambda$, enters the bead layer and encounters a sphere that is not the right size with respect to $\lambda$ to scatter resonantly, it must move on until it encounters a sphere of resonant dimensions. As light moves on it is best if it is least disturbed so that the information it carries is altered as little as possible. This happens when the refractive index of the medium surrounding the beads is close to one.

In order to maintain the partial transparency of the entire bead layer, the refractive index of the dielectric beads should not be too different than one. This also allows each photon to find a resonant scatterer with minimum loss of information.

This is where quantum mechanics again makes the invention work well. The photon's cross section for scattering correlates to its probability for scattering. There are huge numbers of photons in the incoming wavefront which is the image. If many photons encounter a sphere of non resonant dimensions their probability of scattering will not be maximum. A fraction of them will continue. When that fraction, encounters a sphere of resonant dimensions most of them will scatter and the information they are carrying will be recorded.

The more beads there are in the layer the sooner each photon will find its resonant scatterer. This obvious. The photon has a larger probability of finding its resonant scatter if there are a higher number of its resonant scatterers present. This means the more beads the better so long as we don't make the layer opaque to the incoming light. (Opaqueness is a condition of no photograph.)

This is good because as we increase the probability of each photon finding its resonant scatterer, we are increasing the number of beads; which is increasing the optical surface area. These two aspects of the theory complement each other.

The quantum resonant condition for maximum sphericity described (d=λ), can be combined with the classical resonance form Mie's theory (2πd/λ) (n−1)≈4 to yield optimum conditions for the invention. Combining these equations and solving for n gives, n≈1.5.

This refractive index is close to that of glass or polyethylene. Spheres of these materials of the required dimensions can be readily made.

The beads themselves cannot be too densely packed. In the case where two beads are touching the light scatters off it as if it were a single object. Spherical symmetry is lost. Spherical resonance is lost. Scattering resonance is subdued. The function of three dimensional recording is impaired.

Ideally the beads are not touching and are separated by a distance at least equal to their diameter. A large number of beads can still be achieved by making the bead layer thicker.

The photosensitive material should have an exposure sensitivity such that diffraction maxima expose and diffraction minima are dark.

The sphericity is curvature in the electric field. It is magnified and extracted by the spherical beads of resonant dimensions. In the sphericity is contained the depth or three dimensional information. This is a new and novel idea.

The sphericity spoken of is curvature in the electric field, of the travelling photons. It is not circular polarization.

In the films described the polarizing layers may be linear or circular polarizers.

The conventional theory of stereoscopic and holographic collection processes lack the theory that depth is encoded in the polarized sphericity of the incoming light wave that contains the image. This is a discovery of the invention. It gives rise to the novel structures described which function with unexpected results.

CONCLUSIONS RAMIFICATIONS AND SCOPE

Thus the depth or three dimensional information in light is packaged in polarization and sphericity. It is collected by the films described.

This is a new medium for the art of photography. The film can be used in coventional still cameras or motion picture cameras.

The images can be illuminated with natural light or standard white light sources.

The film can be used as a print film or a projection film.

If the photosensitive layer is a photovoltaic or digital recording element the three dimensionality is compromised.

The information in the film is stored in a three dimensional diffraction pattern in and around three dimensional spheres. Once those diffraction patterns are frozen into the photosensitive material the only way to get to that information out is with photons. Those photons then travel to the eye of the viewer and the information is conveyed.

To store the information with electrons, the sphericity and polarization of the incoming light must be converted to a voltage pattern which can then be stored in a magnetic or electronic medium. That medium would have to have three dimensional intelligence. That is the topic of another invention.

Nevertheless, if a photosensitive electronic recording layer or system is placed very close to the bead layer and the resolution of that photosensitive element is high enough to decipher the fine structure of darkness and light in the diffraction pattern some of the depth info will be conveyed to the voltage pattern picked up by the device. This represents an improvement for all television, video or digital reorders of visual images.

The proposed invention can be applied to photons of wavelengths outside the visible range. This would extend the applications into infrared photography and x-ray photograhy.

While the description throughout this specification contains many specificities, these should not be construed as limitations on the scope of the invention but rather as only several preferred embodiments thereof. Accordingly, the scope of the invention should be determined not by the embodiments shown but by the appended claims and their legal equivalents.

I claim:

1. A photographic film in which optical images of light may be collected and stored with enhanced apparent depth comprising:

(a) Parallel plane layers comprising a partially transparent bead layer, and a photosensitive layer, and (b) said light having a range of wavelengths, R(λ), in said surrounding medium, and (c) a portion of said light having a range of diameters approximately within, R(λ).

2. The photographic film of claim 1 wherein said surrounding medium within said bead layer is composed of a photosensitive layer and said original photosensitive layer is absent.

3. The photographic film of claim 1 wherein the refractive index of said surrounding medium $n_{sm}$ is close to one, and said beads are weakly conducting dielectric spheres, and said refractive index of said beads, $n_b$, is different than, $n_{sm}$, and the quantity, $$n = \frac{n_b}{n_{sm}}$$

approximately obeys the relation, $$\frac{2\pi s}{\lambda}(n-1) \cong 4$$

as averaged over the diameters, d, of said beads and the wavelengths, λ of said light.

4. The photographic film of claim 1 wherein said beads are spheres.

5. The photographic film of claim 1 wherein said beads are diffusive particles.

6. The photographic film of claim 3 wherein λ, is the smallest wavelength within R(λ), and $\lambda_L$ is the largest wavelength within R(λ), and said range of diameters further includes the dimensions between 0.3 λ, and 2.5 $\lambda_L$.

7. The photographic film of claim 1 wherein said range of diameters of said beads comprises those dimensions necessary for diffraction to occur when said light scatters off of said beads.

8. The photographic film of claim, 7, wherein said beads have an average spacing α, and said diffraction gives rise to patterns of darkness and light, and said patterns extend a distance, B, away from each bead, and α is greater than B.

9. The photographic film of claim, 8, wherein said surrounding medium is composed of a photosensitive material, and the resolution of said photosensitive material is high enough to record said patterns of darkness and light.

10. The photographic film of claim 9 wherein said photosensitive material is a photosensitive semiconductor.

* * * * *